(12) United States Patent
Uehira (10) Patent No.: US 6,285,023 B1
(45) Date of Patent: Sep. 4, 2001

(54) APPARATUS FOR GENERATING ORIGIN SIGNAL OF OPTICAL LINEAR SCALE (75) Inventor: Takahisa Uehira, Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/265,594

(22) Filed: Mar. 10, 1999

(30) Foreign Application Priority Data

Mar. 27, 1998 (JP) .................................................. 10-081119

(51) Int. Cl.[7] ...................................................... G01D 5/34
(52) U.S. Cl. ................ 250/231.13; 250/231.16; 250/237 G; 356/618
(58) Field of Search ........................ 250/231.13, 231.14, 250/231.16, 231.17, 231.18, 237 G; 356/616, 617, 618, 395; 341/13

(56) References Cited

U.S. PATENT DOCUMENTS 4,912,322 * 3/1990 Ichikawa ............................. 250/237
5,302,820 * 4/1994 Henshaw et al. ............... 250/231.16

* cited by examiner

Primary Examiner—John R. Lee
Assistant Examiner—Kevin Pyo
(74) Attorney, Agent, or Firm—Oblon, Spivak, McClelland, Maier & Neustadt, P.C.

(57) ABSTRACT

In a linear scale, a reference point signal is outputted as a signal which is synchronized with an absolute value. 8 is a a/b phase signal generator forming a two-phase a/b signal of a moving signal by an absolute value which divided the inside of pitch when the a scale moves, 31 is a period counter, 32 is a subtracter, 33 is an up-down counter. An absolute value which divided the scale is preset to an internal counter 38 from a counter 25 at the time of, for example, "on" of a electric source, the counted value is changed by a feedback pulse FB forming a a/b phase output signal when the scale moves, a coincidence pulse Pr is outputted from a count comparator 37 when the internal counter 38 comes to a set value Q within a specific 1 (one) pitch, and a reference pulse Pz showing a position of an origin Z can be obtained synchronously with the absolute value interpolating the inside of pitch by extracting the coincidence pulse Pr at a reference position at which an origin detecting signal Sz is detected.

2 Claims, 13 Drawing Sheets

40 CLOCKS

FIG.7(b)

39 CLOCKS

FIG.7(c)

41 CLOCKS

APPARATUS FOR GENERATING ORIGIN SIGNAL OF OPTICAL LINEAR SCALE

FIELD OF THE INVENTION

This invention relates generally to an optical linear scale for measuring a momentum of relative movement between two objects and more particularly to an apparatus for generating an origin signal of an optical linear scale by which a momentum of relative movement of, for example, a machine tool can be obtained as an absolute value by outputting a reference position as the origin signal in such the scale.

DESCRIPTION OF THE PRIOR ART

It is important in a precision work in a machine tool and so forth to measure accurately a momentum of relative movement of the tool toward an article to be worked.

Figure 9:
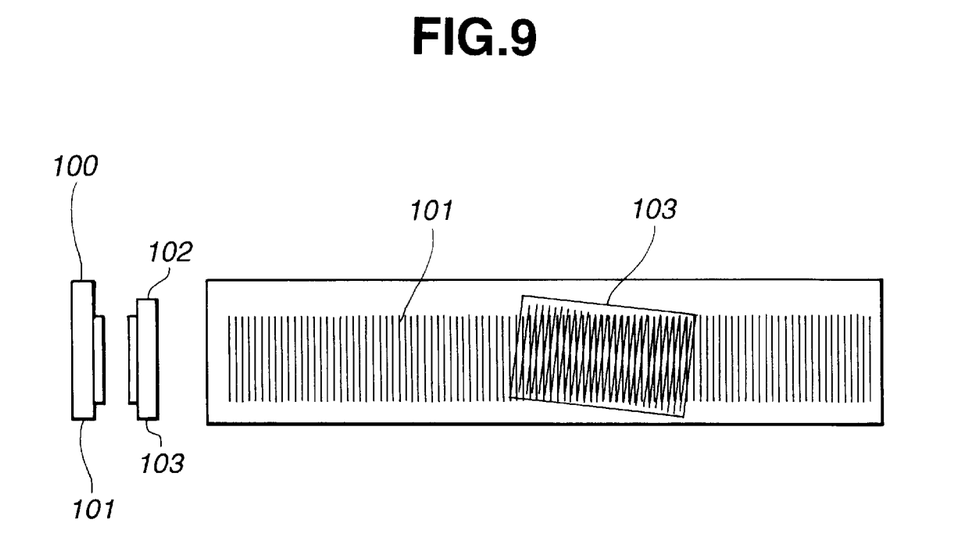
FIG. 9 is a perspective view showing a principle of an optical scale.

As one of them, an optical scale using Moire fringe obtained by superimposing two sheets of optical grating has been conventionally known. This type of optical scale has, as illustrated in FIG. 9, a main scale 101 prepared by forming a grating (a cut line) on one face of a transparent glass scale 100 so that a transparent portion and a non-transparent portion are arranged at prescribed pitch, and an index scale 103 prepared by forming a grating (a cut line) on one face of a transparent glass scale 102 so that a transparent portion and a non-transparent portion are arranged at prescribed pitch, and ,as illustrated in FIG. 9, the index scale 103 is opposed to the main scale 101 at a minute interval and, simultaneously, as illustrated in FIG. 9, the grating of the index scale 103 is arranged so as to incline at a minute angle relative to the grating of the main scale 101.

The gratings provided on the main scale 101 and the index scale 103 are formed by the gratings having equal pitches which are prepared by evaporating in vacuo chromium onto the glass scale 100, 102 and etching.

Figure 10:
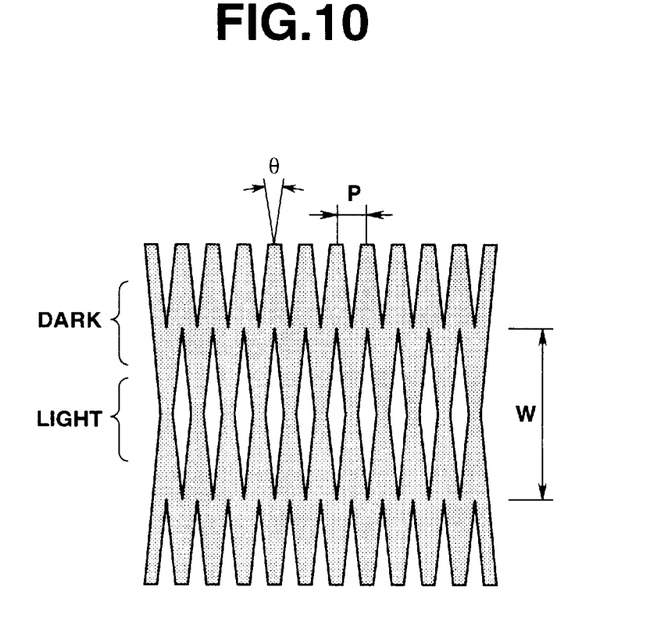
FIG. 10 is a diagram showing Moire fringe.

According to such an arrangement as described above, the Moire fringe shown in FIG. 10 is generated. An interval of this Moire fringe is W, and a dark portion and a light portion are formed at every interval W. The dark portion or light portion moves from the upper part to the lower part or from the lower part to the upper part according to a direction in which the index scale 103 moves relatively from right to left toward the main scale 101. In this case, when a pitch between the main scale 101 and the index scale 103 is P and a tilt angle between them is θ [rad], the interval W of the Moire fringe is shown by the following equation;

W=P/θ, and the interval W of the Moire fringe is one that the interval of the grating P is enlarged optically 1/θ times. Therefore, when the grating moves by one pitch P, the Moire fringe is displaced by W, and therefore, the momentum of the movement within the pitch P can be measured accurately by reading a change of W in upper and lower directions.

Figure 11:
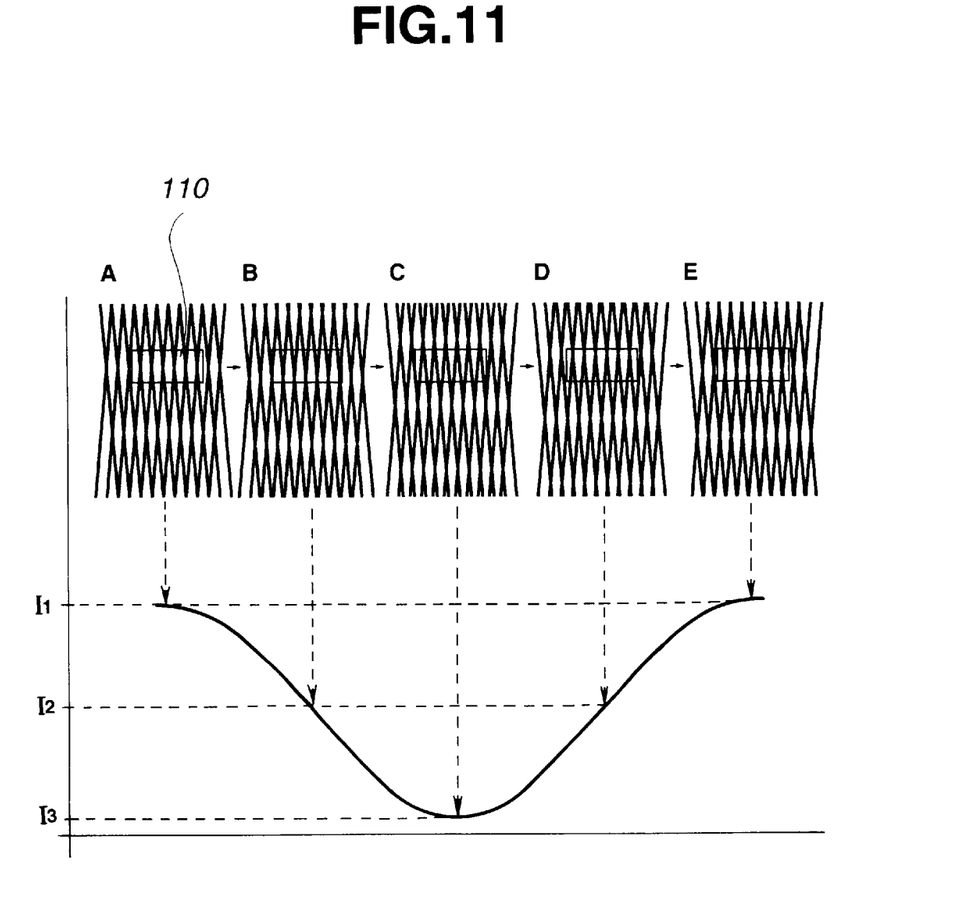
FIG. 11 is a diagram showing movement of Moire fringe.
Figure 12:
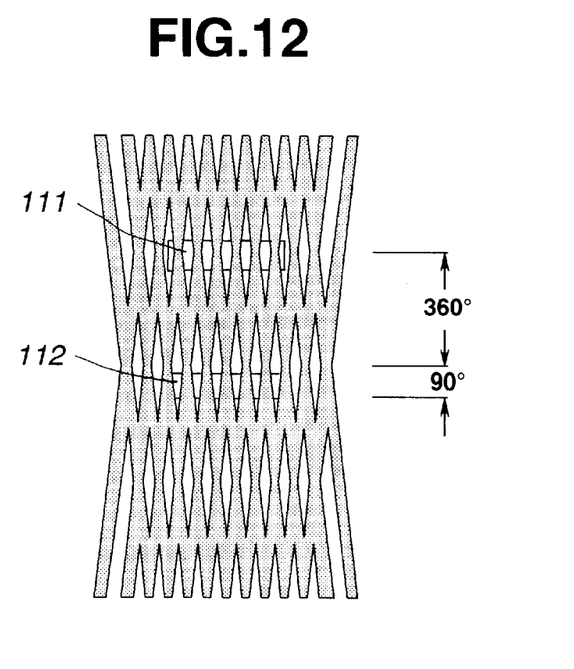
FIG. 12 is a diagram showing positions where photoelectric conversion elements are placed.

Then, as illustrated in FIG. 11, a photoelectric conversion element 110 for detecting optically a change of the Moire fringe is set to the index scale, and a light source is set to opposite side of the main scale, and a change in an electric current flowing through the photoelectric conversion element 110 is read while moving the index scale 103 relatively to the main scale 101.

That is to say, when the index scale 103 is in a state of A relative to the main scale 101, a quantity of light with which the photoelectric conversion element 110 is irradiated is the most largest and the electric current flowing through the photoelectric conversion element 110 comes to a maximum value I₁. Next, being in a state of B after a relative movement, the quantity of light with which the photoelectric conversion element 110 is irradiated decreases somewhat and its electric current is I₂, and then, being in a state of C after further movement, the photoelectric conversion element 110 is irradiated with the most smallest quantity of light and its electric current is also the most smallest I₃. And, being in a state of D after further movement, the quantity of light with which the photoelectric conversion element 110 is irradiated increases somewhat and its electric current is I₂, and when moving to a position in a state of E, the position is one where the quantity of light is the largest and its electric current is a maximum value I₁.

As described above, the electric current flowing through the photoelectric conversion element 110 changes in a state of sinusoidal wave form, and simultaneously, at the time when the change has moved by one period, the main scale 101 and the index scale 103 move relatively by a grating interval P.

Figure 13:
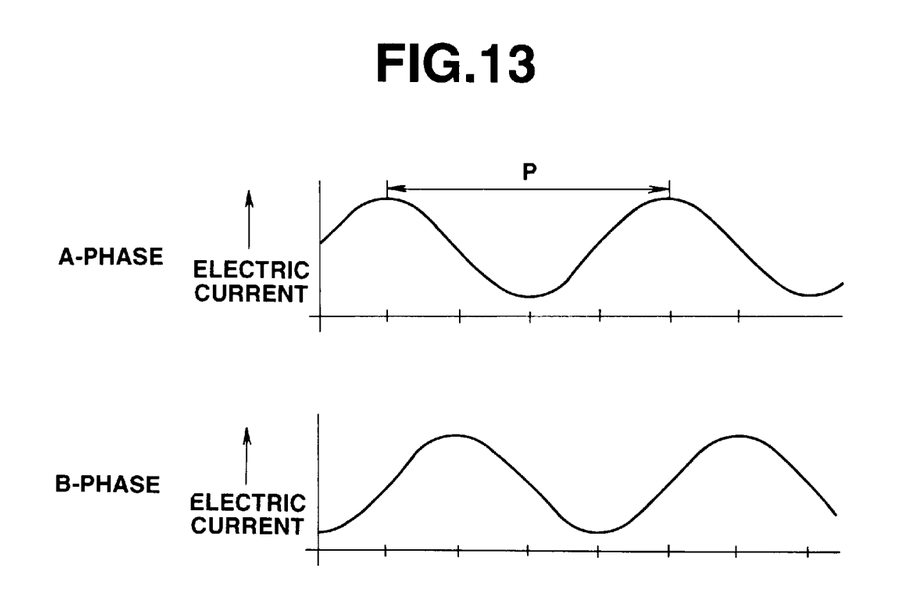
FIG. 13 is a diagram showing wave forms of A-phase signal and B-phase signal.

While only one photoelectric conversion element 110 is mounted in FIG. 11, in the event that two photoelectric conversion elements 110, 111 are mounted to shift one period (interval W) plus 90 degrees respectively as illustrated in FIG. 11, the electric current flowing through the photoelectric conversion element 112 at phase B is shifted 90 degrees relative to the electric current flowing through the photoelectric conversion element 111 at phase A as illustrated in FIG. 13. That is to say, in the event that the electric current flowing through the photoelectric conversion element 111 at phase A is sine wave, the electric current flowing through the photoelectric conversion element 112 at phase B is co-sine wave.

In this case, since the phase of the electric current flowing through the photoelectric conversion element 112 at phase B relative to the electric current flowing through the photoelectric conversion element 111 at phase A is 90 degrees advance phase or 90 degrees delay phase owing to the direction of relative movement of the main scale 101 and the index scale 103, in the event that two photoelectric conversion elements are set to shift 90 degrees, the direction of the relative movement can be detected by detecting the phase between both. An outline of a perspective view of an optical scale using aforementioned principles is shown in FIG. 14.

Figure 14:
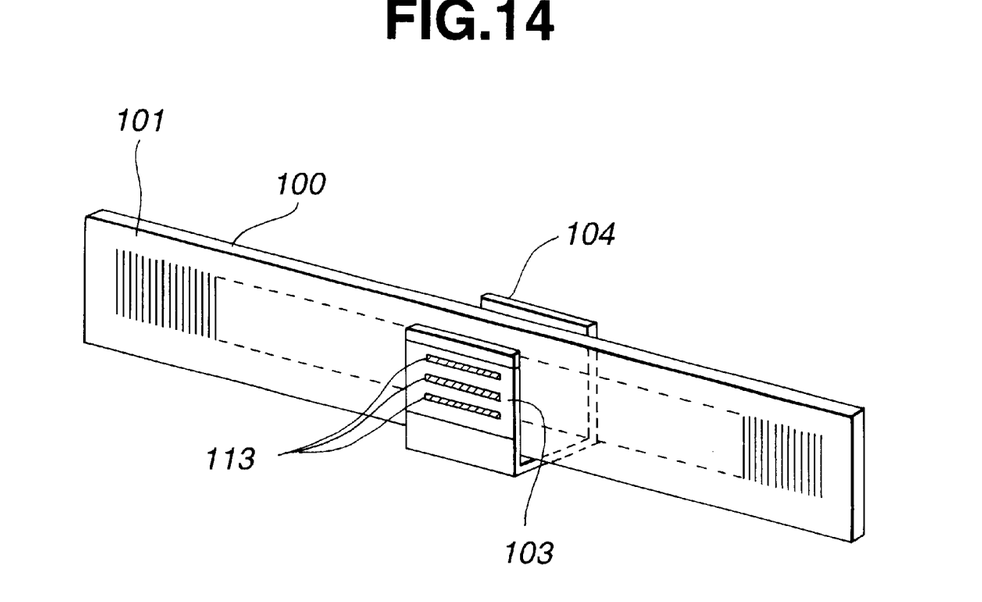
FIG. 14 is a perspective view of an optical scale.

In FIG. 14, a grating having equal pitches which is prepared by vacuum-evaporated chromium are formed on a face of the elongate main scale 101, and the index scale 103 is fixed on a face of an U-shaped holder 104 holding the main scale 101. A grating having equal pitches which is prepared by vacuum-evaporated chromium similarly to the main scale 101 is formed on a face of the index scale 103 opposite to the main scale, and the photoelectric conversion element 111 is mounted to the reverse side of the index scale 103.

Figure 15:
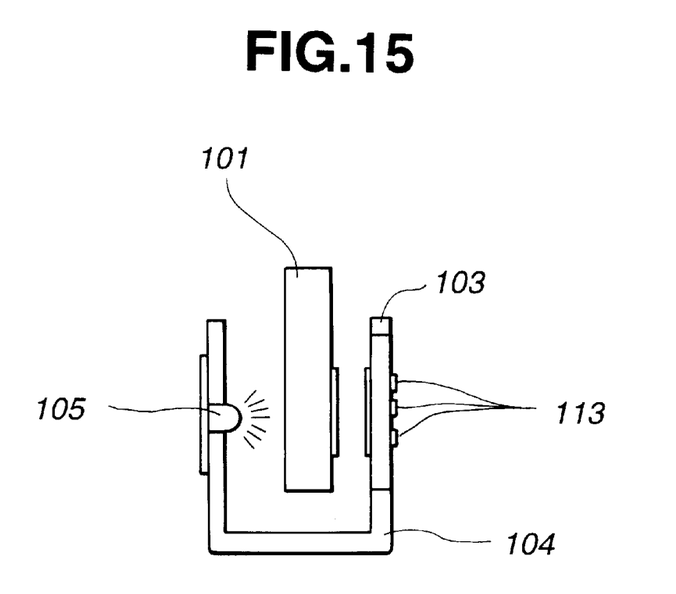
FIG. 15 is a cross-sectional view of an optical scale.

Further, as illustrated in FIG. 15, a light source 105 is placed to the face of the U-shaped holder 104 which is located oppositely to the main scale 101 to detect light transmitted through the main scale 101 and the index scale 103 by means of the photoelectric conversion element 111.

And, the main scale 101 and the index scale 103 can be moved each other.

As described previously, the grating (cut line) of the index scale 103 is opposed to the grating (cut line) of the main scale 101 at a minute interval and, simultaneously, the former can be tilted to the latter at a minute angle.

From a cross-sectional view FIG. 15 showing a principle structure of the optical scale constituted in such a manner as described above, the light generated from the light source 105 passes through the glass-made main scale 101 and then the glass-made index scale 103, and thereafter, is received as Moire fringe by means of the photoelectric conversion element 113.

Signals of phase A and phase B having a phase difference of 90 degrees respectively shown in the aforementioned FIG. 13 are generated from the photoelectric conversion element 113, and the direction of movement and distance of movement can be measured by these two signals as described above.

While the photoelectric conversion element 113 is provided with three photoelectric conversion elements, two of them generate the above mentioned signals of phase A and phase B, and the remainder generates a signal of reference level. And, a detecting signal of more higher accuracy can be obtained by setting the quantity of light received by the photoelectric conversion element of the reference level so as to be a mean signal level (zero level) of phase A or phase B which changes in a sinusoidal wave form.

Figure 16A:
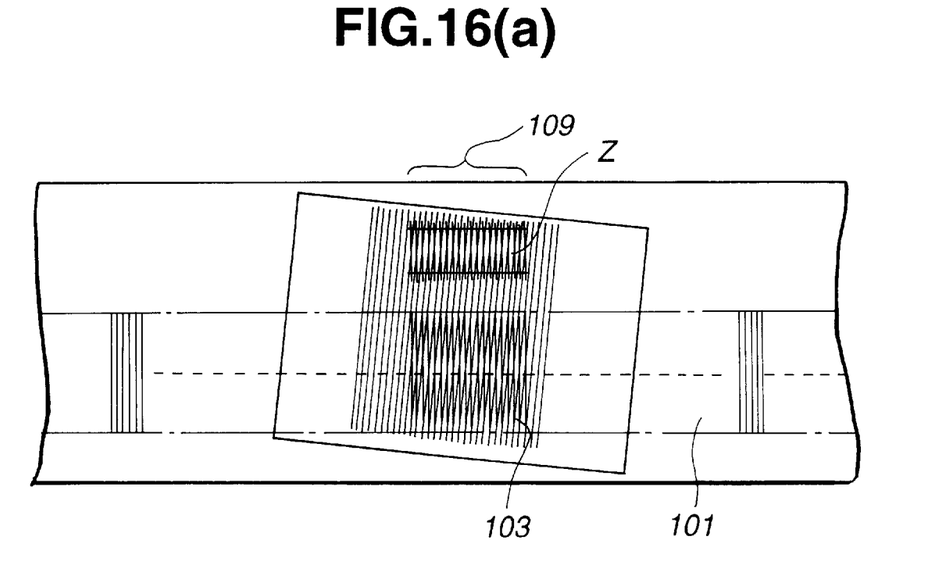
FIGS. 16(a) and 16(b) are an explanatory diagram showing a grating for detecting a position of the origin and its detected wave form.

By the way, while the optical scale constituted in such a manner as described above is mounted to a NC machine tool to measure a relative movement between an object to be worked and the tool, it is necessary to measure the relative movement as a movement from the origin, since the relative movement is, in general, programed as a movement from the origin in the case of numerical control. Therefore, in general, the position of the origin is previously set to the main scale, and the origin is detected at the time when the index scale passes through the position of the origin to form an origin detecting signal, and the position of the origin is set to the NC machine by supplying this origin detecting signal to reset the NC machine. Then, when a cut line (a grating) 109 showing the origin Z as a reference point is set to the prescribed track position different from the position of the cut line on the main scale 101 as illustrated in FIG. 16(*a*) in the above-mentioned optical linear scale and when a photoelectric conversion element for detecting the light transmitted through the grating 109 as the origin and the index scale 103 as Moire fringe is placed, only the time when the main scale 101 and the index scale 103 are in a specific positional relation can be detected as a signal of the origin.

Figure 16B:
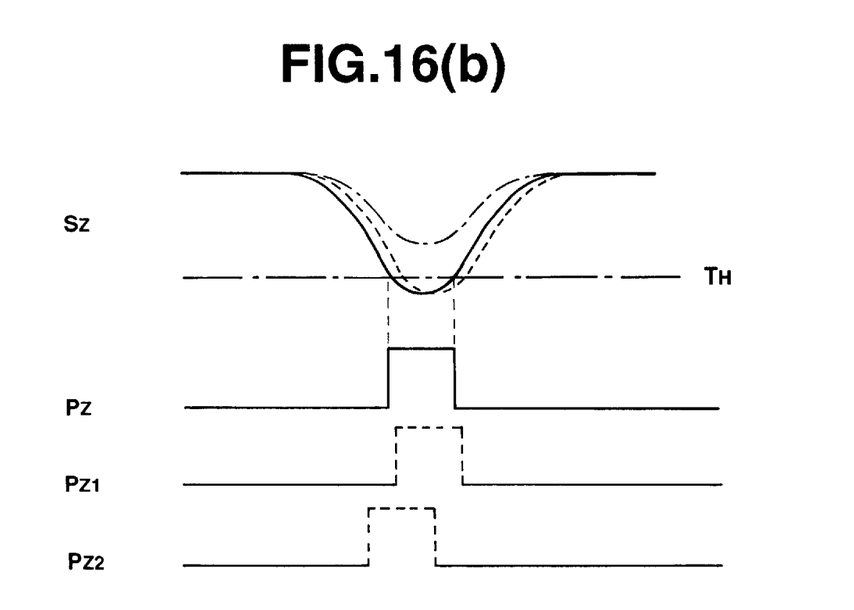

That is to say, since a signal Sz which changes between one pitch P of the main scale 101 similarly to the case of FIG. 11 is detected as the origin detecting signal also at the position of the origin Z as illustrated in FIG. 16(*b*), when the peak point of the wave of the origin detecting signal Sz is clipped at the prescribed level TH as illustrated in, for example, FIG. 16(*b*) to form an origin detecting pulse signal Pz, a rising point of the origin detecting signal Pz can be considered as the origin Z of the main scale.

While, however, the pulse signal Pz of the origin can be detected generally by the relative movement of the main scale 101 and the index scale 103, a problem is encountered in that the level of the detecting signal changes by a relative rate of movement at the time of passing through the origin Z.

For example, when the relative rate of movement between the main scale and the index scale is high, a detecting level is low as shown by one-dotted chain lines in FIG. 16(*b*). Therefore, there is a problem that the rate of movement must be specified when the origin is determined.

Further, since a Moire fringe detecting signal is slightly displaced like pulse Pz 1 and Pz 2 as shown by dotted lines in FIG. 16 depending on a direction in which the origin Z of the main scale 101 approaches the index scale 103, there occurs a case where the position of the origin pulse signal Pz changes.

Since, it is necessary, therefore, to specify previously the direction in which the scale approaches the origin and the rate at which the scale approaches the origin in the case of outputting the origin, a problem is encountered in that an operation for detecting the origin of the scale are complicated.

SUMMARY OF THE INVENTION

In order to solve the aforementioned problems, this invention contemplates a detection by such a circuit as synchronizes a generation of a signal of an origin with a generation of an absolute value.

Therefore, according to a first embodiment of this invention there is provided an apparatus for generating an origin signal of an optical linear scale characterized by comprising a main scale provided with a first grating (cut line) showing at least an origin position and a second grating (cut line ) graduated longitudinally at equal intervals, an index scale provided with a grating across said first and second gratings and which is placed movably relative to said main scale, a photoelectric conversion part for detecting a signal having sinusoidal waveform which changes by one period every relative movement by unit length and an origin detecting signal showing a range of the above-mentioned origin position by means of Moire fringe generated by the grating between said both scales, and an absolute interpolation means for outputting an interpolating data interpolating the inside of the above-mentioned unit length by generating an interpolating pulse signal according to the prescribed phase deviation of the above-mentioned signal having sinusoidal waveform, and characterized by being constituted so that an origin position signal is generated by a logical product of an interpolated pulse signal generated from the abovementioned interpolating means and a signal showing the position of the origin position signal showing the position of the abovementioned origin.

According to a second embodiment of this invention there is provided an apparatus for generating an origin signal of an optical linear scale according to the first embodiment, in which the above-mentioned interpolation position information is formed by a counted pulse showing an absolute value dividing between cut line of said main scale and a pulse signal generated at the time of the movement of the scale.

According to this invention, since the position of the origin Z can be detected by obtaining logic of the origin signal generated at the origin Z and the interpolated pulse signal which is outputted from the interpolating means for further dividing the intervals between the grating, the signal of the position of the origin and the absolute value can be treated as a completely synchronized signal and thereby an accurate origin signal can be obtained regardless of how to approach the origin.

BRIEF DESCRIPTION OF THE DRAWINGS

For a more complete understanding of this invention may be had to the following detailed explanations in connection with the accompanying drawings ,in which

FIGS. 3(*a*)–3(*c*) are diagrams showing timing of a phase modulation circuit.

FIGS. 4(*a*)–4(*d*) are diagrams showing timing of an absolute interpolatin circuit.

DESCRIPTION OF THE PREFERRED EMBODIMENTS

Figure 1:
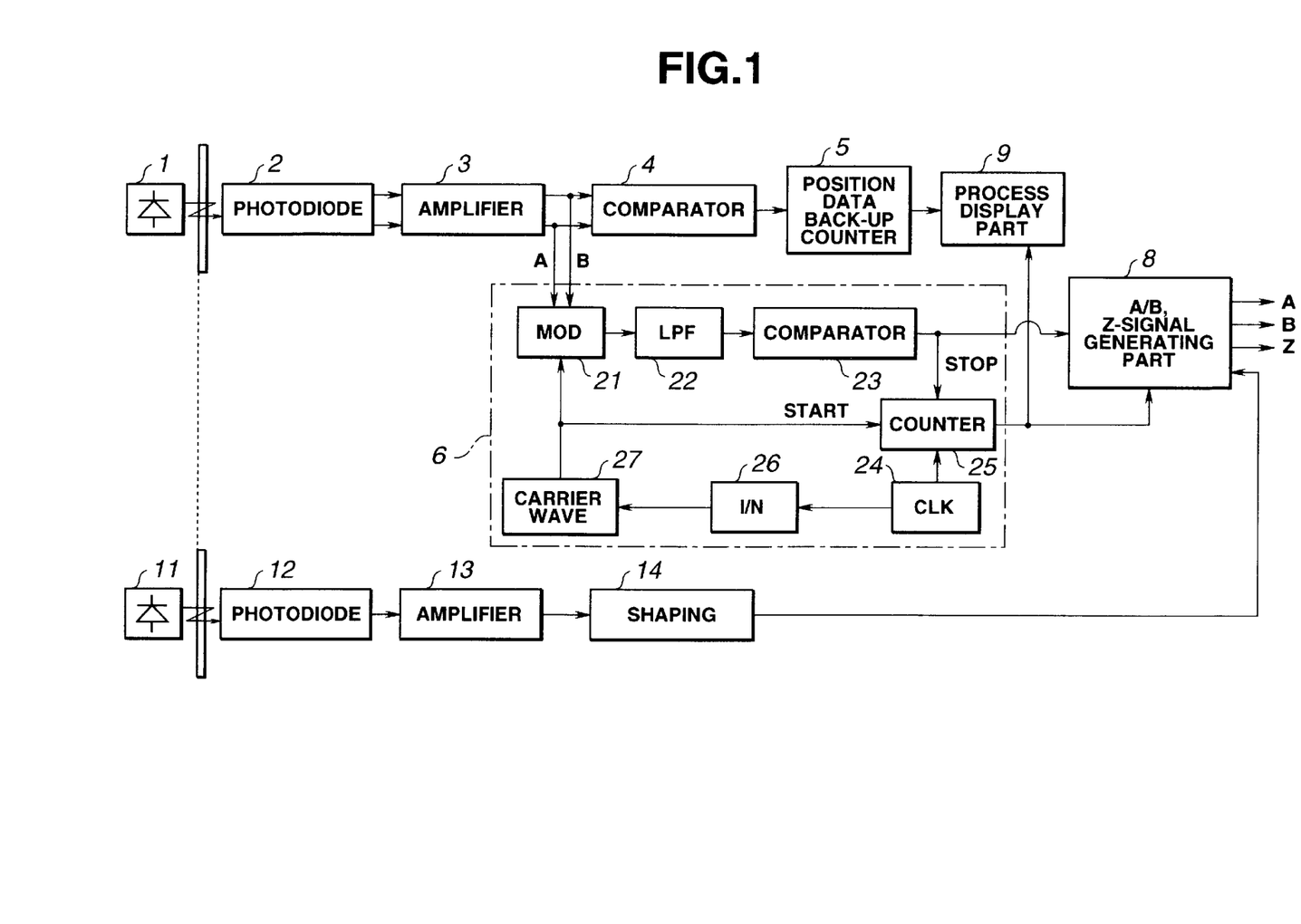
FIG. 1 is a block diagram showing a device for detecting an origin of an optical linear scale of this invention.

The outline of an optical absolute scale of this invention is illustrated in FIG. 1.

In the optical linear scale shown in FIG. 1, the light generated from a light emitting diode 1 as a light source passes through a grating having a pitch P which is formed on a main scale and an index scale, and is received by a photodiode 2 as a photoelectric conversion element. A A-phase signal and a B-phase signal which are received by the photodiode 2 are amplified by a photoelectric conversion amplifier 3 and are then applied to a comparator 4 to form binary data.

The binary data are subjected to an addition count and a subtraction count according to a direction of movement for every movement by pitch P by means of a position data-backup counter 5 to form position data the unit of which is the pitch P which are thereafter supplied to a processor (a display device) 9. The data for interpolating the inside of pitch P as described subsequently are also supplied to the processor 9 to measure further accurate absolute value.

That is to say, the aforementioned A-phase signal and B-phase signal which are outputted from the photoelectric conversion amplifier 3 are supplied to an absolute interpolation circuit 6, and are composed by the absolute interpolation circuit 6 so as to count an interpolation pulse dividing finely the aforementioned grating pitch P to form a counted pulse, and thereafter, the interpolation data which divided the inside of pitch P are outputted to the aforementioned processor 9 by outputting the counted pulse from a counter 25.

Further, a a/b phase signal generator 8 to which a signal the phase of which has been modulated by the absolute interpolation circuit 6 has been applied generates a A-phase pulse signal and a B-phase pulse signal showing the interpolation data which divided the inside of pitch P as the number and phase of pulse as described subsequently to supply to a numerical control machine (NC), and, simulatneously, generates a Z-phase pulse signal as an origin signal showing a reference point. And, the direction of movement of the machine tool and momentum of movement thereof can be controlled by these pulse signals.

This invention is provided with a light source 11 (a light emitting diode) so as to generate Moire fringe by means of the grating 109 which is cut on the main scale 101 and which forms the origin position Z and the index scale 103, a photodiode 12 for detecting Moire fringe generated of the origin, an amplifier 13 for amplifying its output, and a wave shaping circuit 14 for forming the output of the amplifier 13. (There is a case where the light source 11 may be used for a light source 1).

And, this invention is constituted so that a reference pulse signal Sp for detecting the point of the reference position Z cut on the main scale can be obtained synchronously with the aforementioned A-phase or B-phase output signal by inputting a detecting output of the position of the origin which detected Moire and a coincidence output of a count comparator 37 as described subsequently to a reference signal generating section 36.

In this Example, when the interval between the grating on the main scale and that on the index scale is 40 micron, 40 (forty) pulses can be counted at one period of the A-phase signal and the B-phase signal which are inputted to the aforementioned absolute interpolation circuit 6, and, therefore, an optical scale the resolution of which is 1 (one) micron can be obtained.

The absolute interpolation circuit 6 comprises a phase modulation circuit 21 for supplying a phase deviation to a carrier wave according to levels of inputted A-phase signal and B-phase signal, a low pass filter (LPF) 22 for extracting a fundamental wave of phase deviated output signal of the phase modulation circuit 21, a comparator 23 for binarizing an output signal of the low pass filter 22, a counter which starts a count at the edge of the binarized carrier wave and stops it at the edge of output signal of the comparator 23, a clock generator 24 for generating clocks which are counted by the counter 25 and which form the carrier wave, a frequency divider 26 for dividing the clock of the clock generator 24, and a carrier wave generator 27 for generating the carrier wave by means of an output from the frequency divider 26, and is a circuit having a function for dividing the inside of pitch P in order to improve the resolution.

Figure 2:
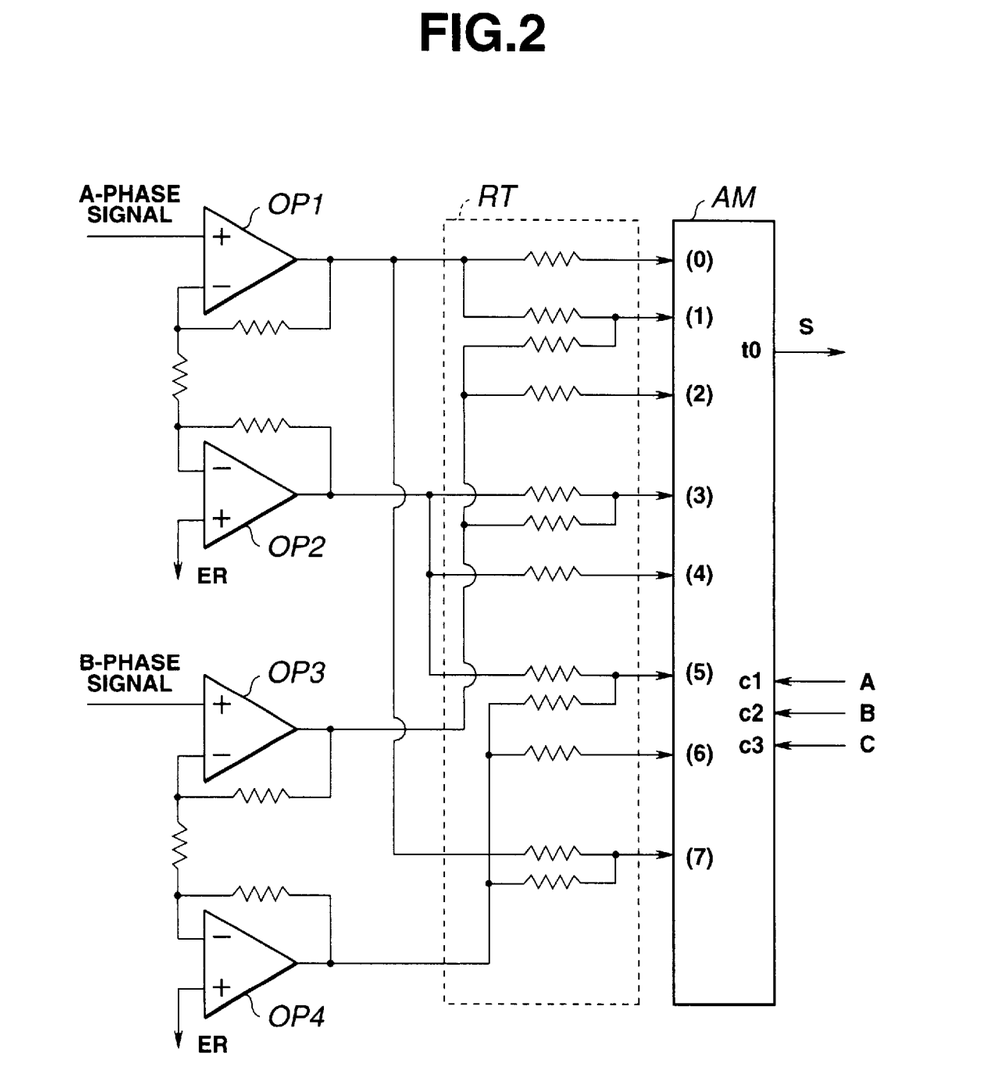
FIG. 2 is a circuit diagram showing a phase modulation circuit.

The phase modulator 21 is constructed as described in, for example, Japanese Patent Application, Laying-open SHO 62 (1987) -132210, Publication and is described in detail in FIG. 2 in which an inputted A-phase signal is supplied to a network resistor RT through an operational amplifier OP1 operating as a buffer, and, simultaneously, is reversed by means of an operational amplifier OP 2 to be supplied to the network resistor RT.

And, a B-phase signal is supplied to the network resistor RT through an operational amplifier OP 3 operating as a buffer, and, simultaneously, is reversed by means of an operational amplifier OP 4 to be supplied to the network resistor RT.

That is to say, the A-phase signal, reversed A-phase signal, B-phase signal and reversed B-phase signal are added in mixture by means of the network resistor RT to form mixed-signals containing eight-divided signals the phases of which are contrary each other and having equal voltages, which are supplied to eight input terminals (0)–(7) of a multiplexer AM ,respectively. To the input terminals C1, C2 and C3 are inputted selecting signals A,B and C, as illustrated in FIG. 3 (c), by which the input terminals (0)–(7) of the multiplexer AM are selected in order, and an output signal S in the form of step as shown in FIG. 3(a) is outputted from an output terminal.

Figure 3A:
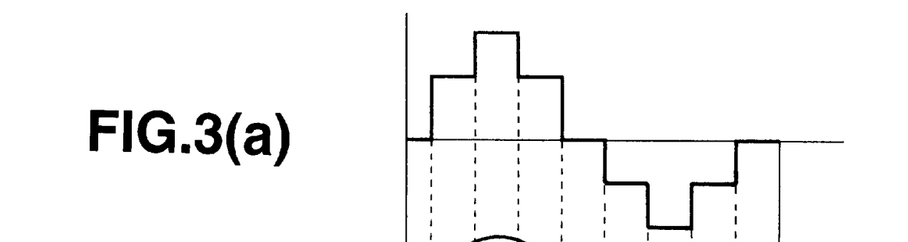
Figure 3B:
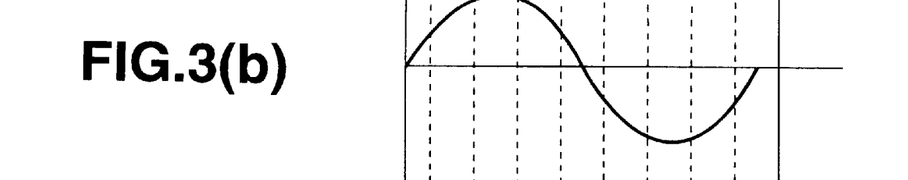
Figure 3C:
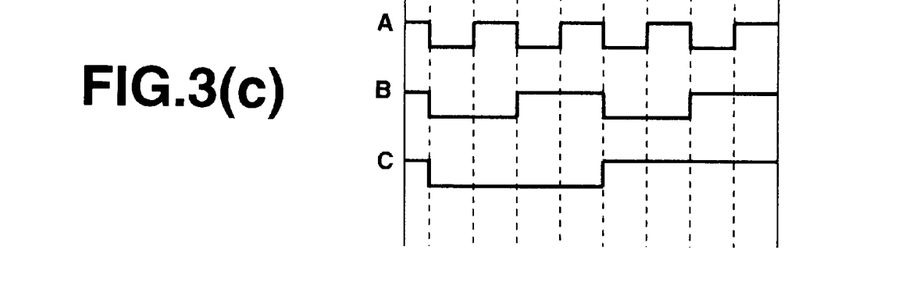

The frequency of the signal S outputted from the multiplexer AM is, as illustrated in FIG. 3, the same as that of the selecting signal C, and, eventually, the output signal S the phase of which is balance-modulated at the level of the A-phase signal (B-phase signal) by the selecting signal C as the carrier wave is outputted from the multiplexer AM. That is to say, the carrier wave the phase of which is modulated according to the level of the A-phase signal (B-phase signal) is outputted.

Thus balance-modulated carrier wave is applied to a LPF 22 to form a smooth sinusoidal wave as shown in FIG. 3(b).

This signal s is expressed by an equation of

S=K·Cos ($\omega$t−2$\pi$·x/p), where $\omega$ is an angular velocity of the frequency of the carrier wave, p is an interval between the grating, and x is a momentum of movement, and this signal is a signal which shows the ratio of the momentum (x) of the scale to and the pitch P (x/p) as a change in phase.

The point at level zero of this signal S is converted to a binary signal as an edge by means of the comparator 23. The relationship between the phase of the binary signal outputted from the comparator 23 and the levels of A-phase signal and B-phase signal which are inputted to the absolute interpolation circuit 6 is illustrated in FIG. 4.

The signals which change in a state of sinusoidal waveform shown on the left in FIG. 4 are A-phase signal and B-phase signal, and the pulse waveform on the right in FIG. 4 is a binary signal of the carrier wave from the comparator 23 which is phase-deviated, and its position shown by a broken line is a position of zero phase of the carrier wave which is supplied to the phase modulation circuit 21.

In the case where A-phase signal is at positive maximum level and B-phase signal is at zero level, a binary signal which is phase-deviated 90 degrees is formed as illustrated by (a) of FIG. 4, in the case where A-phase signal is at zero level and B-phase signal is at positive maximum level, a binary signal which is phase-deviated 180 degrees is formed as illustrated by (b) of FIG. 4, in the case where A-phase signal is at negative maximum level and B-phase signal is at zero level, a binary signal which is phase-deviated 270 degrees is formed as illustrated by (c) of FIG. 4, and in the case where A-phase signal is at zero level and B-phase signal is at negative maximum level, a binary signal which is phase-deviated 360 degrees is formed, that is to say, a binary signal which is not phase-deviated and which has returned to an original state is formed as illustrated by (d) of FIG. 4.

Since the phase modulation circuit 21, LPF 22 and comparator 23 are constructed in such a manner as above described, the interpolation data which divided the inside of the grating pitch P can be obtained. For example, the interpolation data which divided the inside of the grating pitch P can be obtained by counting clocks from the position at zero phase of the carrier wave to rising of the output of the comparator 23. Then, an interpolation absolute value which divided the inside of the grating pitch P can be obtained by the counter 25 when a count of the counter 25 is started by an edge of the carrier wave from a carrier wave generating circuit 27 and is stopped by a rising edge of binary output of the comparator 23.

The counted pulses in this case are shown in FIG. 5. In FIG. 5, however, the frequency of the clock generated from a clock generator is 40 times that of the carrier wave generated from the carrier wave generator 27 (the frequency divider 26 divides in to 1/40).

Figure 4A:
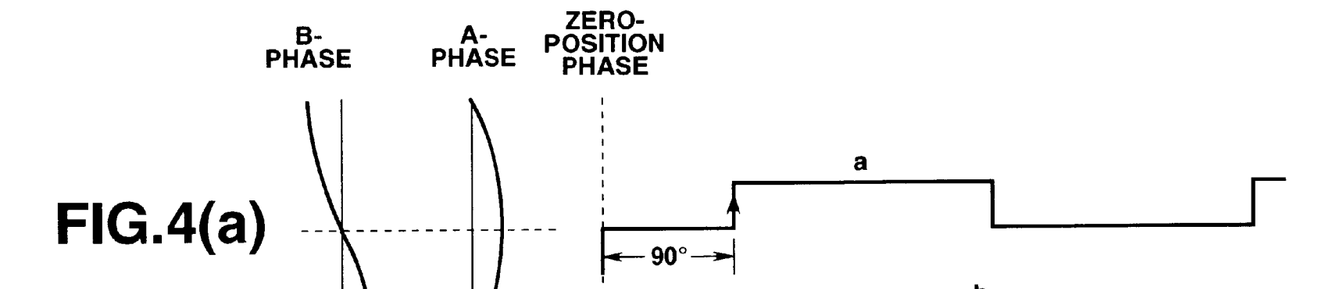
Figure 4B:
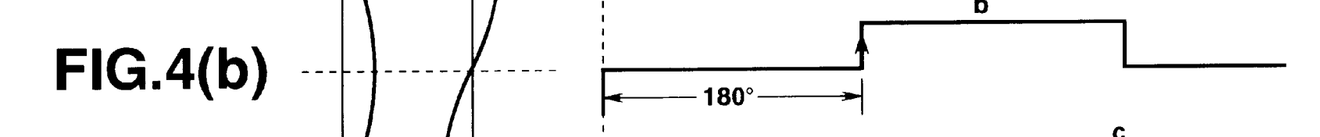
Figure 4C:
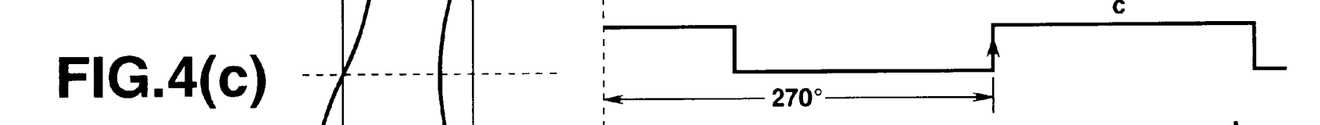
Figure 5A:
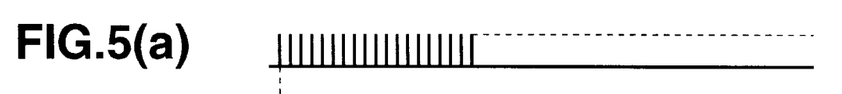
FIGS. 5(a)–5(e) are diagrams showing timing of an interpolated pulse.
Figure 5B:
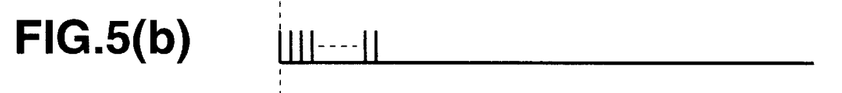
Figure 5C:
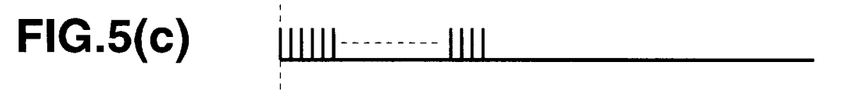
Figure 5D:
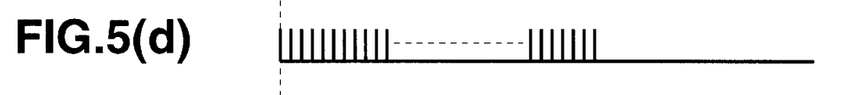

FIG. 5(a) shows clocks generated from the clock generator 24, and FIG. 5(b) shows the case where the position at point of FIG. 4(b) moves by 1/4 pitches to the position (a), and the counter 25 counts 10 clocks. And, FIG. 5(c) shows the case shown in FIG. 4(b), and the counter 25 counts 20 clocks after 1/2 pitches movement. And, FIG. 5(d) shows the case shown in FIG. 4(c), and the counter 25 counts 30 clocks after 3/4 pitches displacement.

Figure 4D:
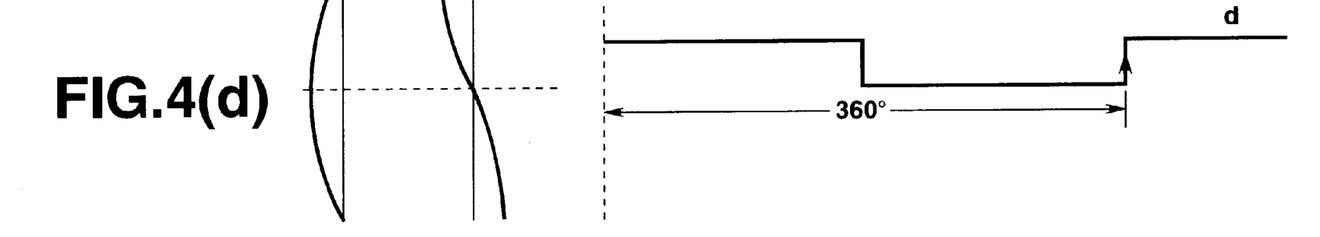
Figure 5E:
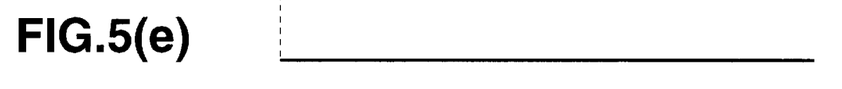

And, FIG. 5(e) shows the case shown in FIG.(d), and the counter 25 counts no clock since the phase deviation is 360 degrees.

As described above, in the case where the frequency of the clock counted by the counter 25 is 40 times that of the carrier wave, magnification x 40 of resolution can be obtained, since the counter 25 counts 1 pulse each time it moves in quantity of the grating pitch P divided into 40. Accordingly, in the case where the grating pitch is 40 microns, the resolution is 1 micron. That is to say, the number of the pulse interpolated is [0–39].

While the clocks divided by the frequency divider 26 the dividing ratio of which is set at ⌈40⌋ is supplied to the carrier wave generating circuit 27, the resolution of 0.2 microns can be obtained, if the dividing ratio of the frequency divider 26 is set at ⌈200⌋.

Figure 6A:
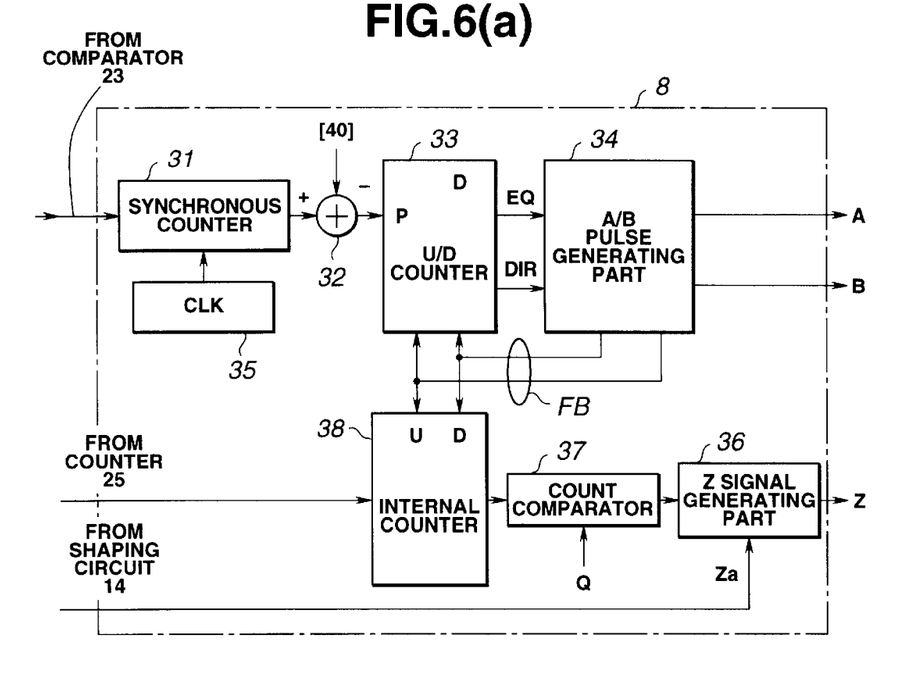
FIGS. 6(a) and 6(b) are a block diagram showing a a/b phase signal generating circuit and an extraction of an origin signal.
Figure 6B:
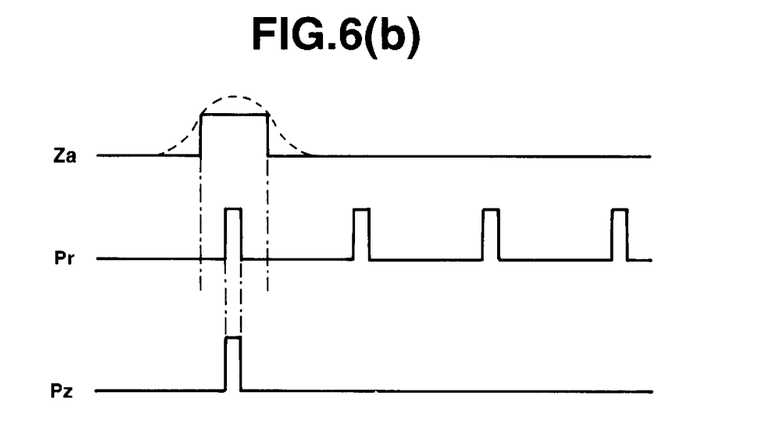

Next, the outlines of a a/b phase signal generating circuit 8 and a circuit forming an origin signal are shown as a block diagram in FIG. 6.

The circuit shown in FIG. 6 comprises a period counter 31 for measuring a period of an output signal of the comparator 23 in the absolute interpolation circuit 6, a subtracter 32 for subtracting a prescribed set value from a counted value of the period counter 31, an up-down counter 33 for counting a feedback pulse FB generated from an AB phase pulse generator 34 until the subtracted value from the subtracter 32 is preset and its counted value is zero, an AB phase pulse generator 34 which receives an equal signal EQ and direction signal DIR from the up-down counter 33, and generates the feedback pulse FB by one pulse until the equal signal EQ is extinguished, and simultaneously, generates a A-phase pulse signal and a B-phase signal by the feedback pulse FB and the direction signal DIR to supply to a NC machine and the like, and a reference clock generator 35 generating clocks counted by the period measuring counter 31.

36 shows a reference signal generating part for forming an origin pulse signal S P to one input of which, as shown in FIG. 6(b), a detecting wave for an origin detecting signal Za outputted from the aforementioned waveform shaping circuit 14 is inputted, and to the other input of which an incidence output Pr of a count comparator 37 shown in FIG. 6 is inputted.

A counted value of the counter 25 shown in FIG. 1 is preset to the count comparator 37 to which a counting output is inputted from an internal counter 38 in which the value is changed by the aforementioned feedback pulse FB.

And, an origin pulse signal Pz can be extracted from the coincidence output Pr outputted from the count comparator 37 by taking a logical product of the origin detecting signal Za and the coincidence output Pr of the count comparator 37 by means of the reference signal generating part 36.

Figure 7A:
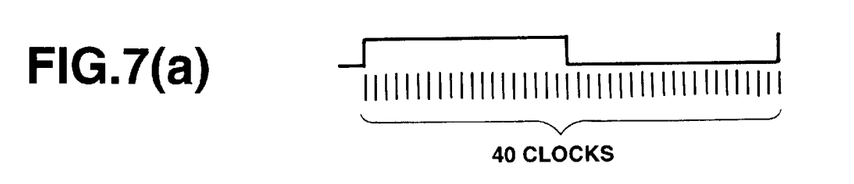
FIGS. 7(a)–7(c) are diagrams showing timing of a period measuring counter.

The period counter 31 is a counter for measuring a period of the carrier wave which is phase-modulated by the phase modulation circuit 21 within the absolute interpolation circuit 6, and counts the reference clock by 40 clocks as shown in FIG. 7(a) when the period of the phase modulated carrier wave is not changed in the case where the main scale and the index scale are relatively stationary. However, this is the case where the number of the interpolated pulse in the absolute interpolation circuit 6 is set to ⌈40⌋ to increase the resolution to 40x magnification. That is to say, since the frequency of the reference clock is the same as that of the clock from the clock generator 24 within the absolute interpolation circuit 6, the period measuring counter 31 counts, in general, by the combined-use of the clock generated from the clock generator 24 within the absolute interpolation circuit 6 as the reference clock.

Figure 7B:
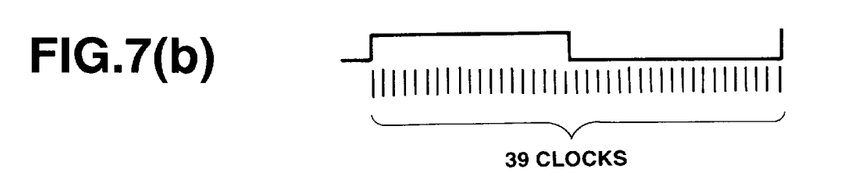
Figure 7C:
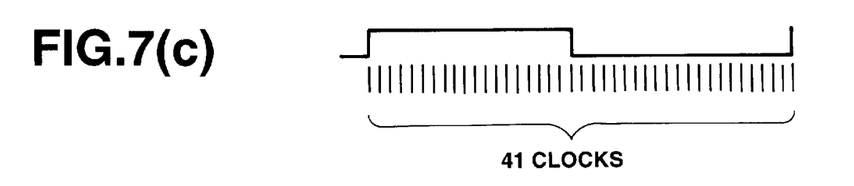

And, at the moment that the main scale and the index scale move relatively to the left by 1 μm, the period of the phase modulated carrier wave shortens and the number of the counted clock of the period measuring counter 31 is 39 pulses as shown in ,for example FIG. 7(b) , on the contrary, in the case where the main scale and the index scale move relatively to the right by 1 μm, the period of the phase modulated carrier wave lengthens and the number of the counted clock of the period measuring counter 31 is 41 pulses as shown in, for example FIG. 7(c).

As described above, when the relative movements of the main scale and the index scale take place, the period counter 31 changes its counted value around 40 every period of the phase modulated wave when the resolution is magnification ×40 according to the movement within the grating.

In such a manner as described above, the data on the phase modulated carrier wave measured by the period measuring counter 31 is supplied to the subtracter 32, and the set value [40] is subtracted. Accordingly, in the case of being stationary, [0] is outputted from the subtracter 32 as shown in FIG. 7(a), and [0] is preset to the up-down counter 33. And, when moving to the left, [−1 and below] is outputted from the subtracter 32, as shown ,for example in FIG. 7(b) , and ,for example, [−1 and below] is preset to the up-down counter 33.

And, when moving to the right, [1 and above] is outputted from the subtracter 32 as shown in FIG. 7(c) , and ,for example, [1 and above] is preset to the up-down counter 33.

Next, the operations of the up-down counter 33 and AB phase pulse generator 34 are explained taken in conjunction with FIG. 8. In FIG. 8, there is shown a case as one example where the scale moves from a certain position by (+) or (−) 3/40 pitches and [+3] or [−3] is preset to the up-down counter 33.

Figure 8A:
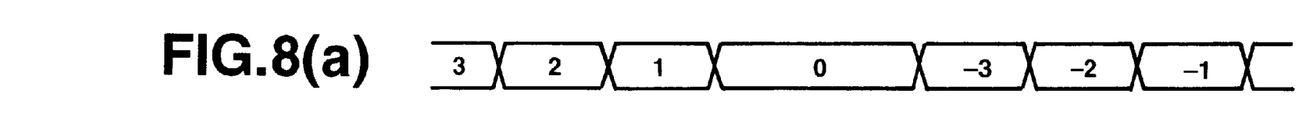
FIGS. 8(a)–8(f) are diagrams showing operating timing of an AB-phase pulse generator.
Figure 8B:
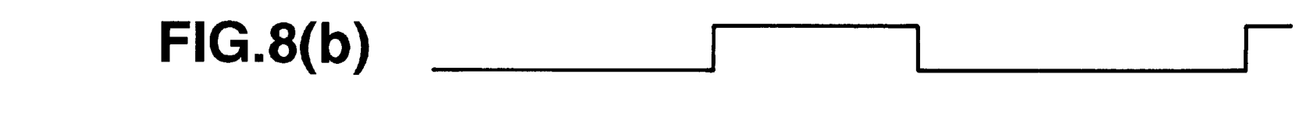

First, as shown in FIG. 8(a) , when the scale moves and [3] is preset to the up-down counter 33, the equal signal EQ the level of which is [L ] when the counted value is not zero, and the direction signal DIR of level [H] showing the direction of movement are outputted from the counter 33 as shown in FIG. 8(b) and (c). And, the AB phase pulse generator 34 receives the signal EQ and the signal DIR and generates a feedback pulse FB by one pulse (A1) as shown in FIG. 8(d) to supply to the up-down counter 33.

At the moment, since the signal DIR is at [H] level, the up-down counter 33 is subjected to down-count by the feedback pulse FB and its counted value is [2] , and the feedback pulse FB is further generated by one pulse (A2) because the state of [L] level of the signal EQ is maintained, and then, the up-down counter 33 is further subjected to down-count by the feedback pulse FB and its counted value is [1] . However, since the state of [L] level of the signal EQ is maintained, the feedback pulse FB is further generated by one pulse (A3) and then, the up-down counter 33 is further subjected to down-count by the feedback pulse FB and its counted value is [0], and the level of the equal signal EQ is [H]. Accordingly, the feedback pulse FB outputted from the AB phase pulse generator 34 is stopped.

Figure 8C:
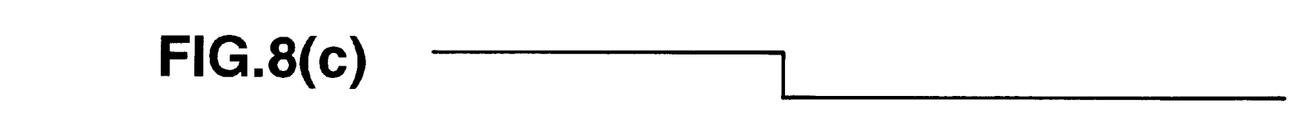
Figure 8D:
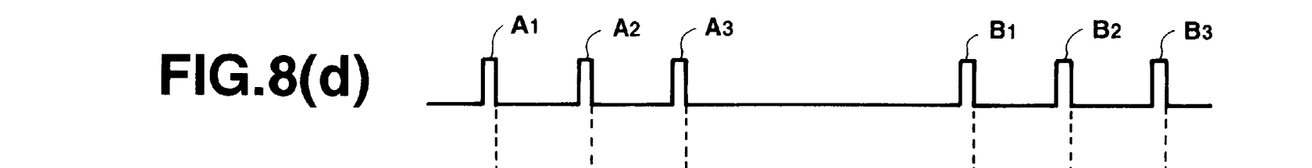
Figure 8E:
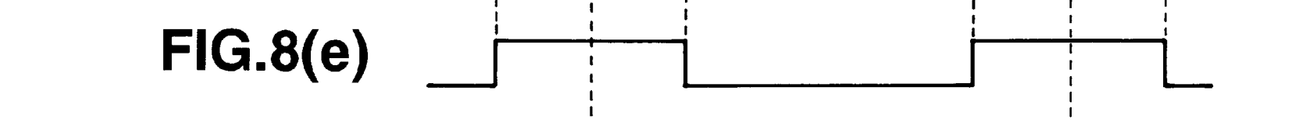
Figure 8F:
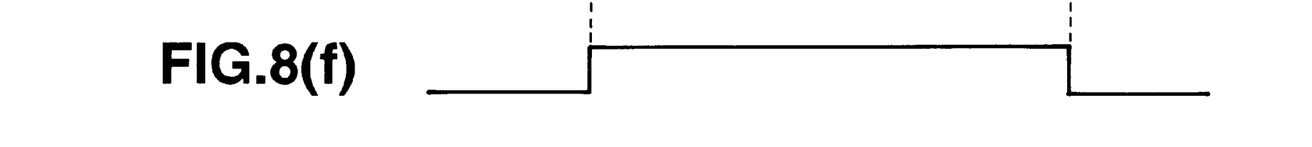

On the other hand, as shown in FIG. 8(e) and (f), in the AB phase pulse generator 34, the A-phase signal is reversed to [H] level at trailing edge of the feedback pulse FB of A1, and the B-phase signal is reversed to [H] level at trailing edge of the feedback pulse FBA of A2, and further the A-phase pulse signal is reversed to [L] level at trailing edge of the feedback pulse FB of A3.

Assuming that, when the counted value of the up-down counter 33 is [0], the direction signal DIR is reversed to [L] level as shown in FIG. 8(c) by reversal of the direction of movement, and the momentum of movement, for example, [−3] is preset to the up-down counter 33 as shown in FIG. 8(a) . Then, an equal signal EQ the level of which is [L] when the counted value is not [0] and a direction signal DIR of [L] level showing the direction of movement are outputted as shown in FIG. 8(b) and (c) . And, the AB phase pulse generator 34 receives this signal EQ and signal DIR and generates a feedback pulse FB by one pulse (B1) to supply to the up-down counter 33.

At the moment, since the signal DIR is at [L] level, the up-down counter 33 is subjected to up-count by the feedback pulse FB and its counted value is [−2], and the feedback pulse FB is further generated by one pulse (B2) because the [L] level state of the signal EQ is maintained, and then, the up-down counter 33 is further subjected to up-count by the feedback pulse FB and its counted value is [−1]. However, since the state of [L] level of the signal EQ is maintained, the feedback pulse FB is further generated by one pulse (B3) and then, the up-down counter 33 is further subjected to up-count by the feedback pulse FB and its counted value is [0], and the level of the equal signal EQ comes is [H]. Accordingly, the feedback pulse FB outputted from the AB phase pulse generator 34 is stopped.

On the other hand, as shown in FIG. 8(e) and (f), in the AB phase pulse generator 34, the A-phase signal is reversed to [H] level at trailing edge of the feedback pulse FB of B1, and the B-phase signal is reversed to [L] level at trailing edge of the feedback pulse FB of B2, and further the A-phase pulse signal is reversed to [L] level at trailing edge of the feedback pulse FB of B3.

The A-phase pulse signal and B-phase pulse signal which are generated in such a manner as described above are supplied to a NC machine and the NC machine detects the momentum of movement by detecting the edges of the A-phase signal and B-phase signal and, simultaneously, detects the direction of movement by a relationship of phase between the A-and B-phase pulse signal.

By the way, according to this invention, the a/b phase signal generator 8 is provided with the reference signal generating part 36, the count comparator 37, and the internal counter 38. And a coincidence pulse output Pr of the count comparator 37 and a detecting signal Sz of the origin Z are inputted to the reference signal generating part 36.

The count value of the aforementioned internal counter 38 is inputted to the count comparator 37.

An initial value of interpolated absolute value outputted from the counter 25 is preset to the internal counter 38 at the time of, for example, "on" of the electric source, and this counting value changes by the feedback pulse FB outputted when the scale moves and counts 0–39 every one pitch movement.

Accordingly, when the scale moves from the specific value (initial value) between the initial pitch shown by the counter 25, a/b phase signal is generated from this point as shown in FIG. 8, and, simultaneously, the counting value of the internal counter 38 changes synchronously with the a/b phase signal.

Since the coincidence pulse Pr is outputted from the count comparator 37 when the internal counter 38 comes to a set value Q within the specific one pitch, the coincidence pulse Pr can be obtained from the specific position obtained by dividing the intervals between each cut line, and the reference pulse $P_z$ showing the position of the origin Z can be obtained synchronously with an absolute value interpolating between the pitch by extracting the coincidence pulse $P_r$ at the reference position where the origin detecting signal $S_z$ is detected.

Since this reference pulse $P_z$ is outputted completely synchronously with the abovementioned A-phase output signal or B-phase signal which is outputted by dividing the inside of the pitch, it is a signal showing always the specific position, even if the scale approaches the origin Z from all directions at any speeds, and it, therefore, can set the reference position of exceptionally highly accuracy.

Since this invention is, as above described, constituted so as to determine a position signal of an origin synchronously with a signal which divided the intervals of the grating and which shows the position, it has an effect that an origin signal of highly accuracy can be always obtained regardless of the speed at which the scale passes through the origin and the direction of movement.

What I claim is:

1. An apparatus for generating an origin signal of an optical linear scale, comprising:

a main scale provided with a first cut line showing at least an origin position and a second cut line graduated longitudinally at equal intervals;

an index scale provided with a cut line across said first and second cut lines, which is placed movably relative to said main scale;

a photoelectric conversion part for detecting Moire fringe generated by the cut lines between said both scales and for generating a signal having sinusoidal waveform which changes by one period every relative movement by unit length and an origin detecting signal showing a range of the above-mentioned origin position; and an absolute interpolation means for outputting an interpolating data interpolating the inside of the above-mentioned unit length by generating an interpolating pulse signal according to a prescribed phase deviation of the above-mentioned signal having sinusoidal waveform, wherein an origin position signal is generated by a logical product of an interpolated count value showing a specific interpolation position information outputted from the above-mentioned absolute interpolation means and the origin detecting signal showing the above-mentioned origin position.

2. An apparatus for generating an origin signal of an optical linear scale as claimed in claim 1, wherein the above-mentioned interpolation position information is formed by a counted pulse showing an absolute value dividing between cut line of said main scale and a pulse signal generated at the time of the movement of the scale.

* * * * *